United States Patent [19]

Ogawa

[11] Patent Number: 5,428,676
[45] Date of Patent: Jun. 27, 1995

[54] FACSIMILE MACHINE AND RE-CALL CONTROL METHOD THEREOF

[75] Inventor: Fukushige Ogawa, Hachioji, Japan

[73] Assignee: Kabushiki Kaisha Toshiba, Kawasaki, Japan

[21] Appl. No.: 275,705

[22] Filed: Jul. 18, 1994

Related U.S. Application Data

[63] Continuation of Ser. No. 661,014, Feb. 26, 1991, abandoned.

[30] Foreign Application Priority Data

Feb. 27, 1990 [JP] Japan ................... 2-46715

[51] Int. Cl.⁶ ............................. H04M 11/00
[52] U.S. Cl. ........................ 379/100; 379/355; 358/440; 358/468; 358/434
[58] Field of Search .......... 358/434, 440, 468, 403, 358/437; 379/100, 355

[56] References Cited

U.S. PATENT DOCUMENTS

| | | | |
|---|---|---|---|
| 4,741,029 | 4/1988 | Hase et al. | 379/355 |
| 4,807,276 | 2/1989 | Okabe | 379/100 |
| 5,050,208 | 9/1991 | Wada | 379/100 |
| 5,055,945 | 10/1991 | Oguma et al. | 379/100 |

Primary Examiner—Curtis Kuntz
Assistant Examiner—Ping W. Lee
Attorney, Agent, or Firm—Finnegan, Henderson, Farabow, Garrett & Dunner

[57] ABSTRACT

A facsimile machine where a plurality of re-call intervals and frequencies are set on a system basis or on a destination terminal basis depending on communication modes and communication quantities to perform re-calling operation as necessary according to the conditions set on the system basis or on the destination terminal basis.

16 Claims, 6 Drawing Sheets

SYSTEM SETTING DATA TABLE

| COMMUNICATION MODE | RE-CALL INTERVAL(MIN.) | RE-CALL EFFECTIVE PERIOD (MIN.) | EFFECTIVE TIME | |
|---|---|---|---|---|
| G3 | 10 | 30 | 9:00 ~ 11:00 | |
| G3 | 5 | 15 | 11:00 ~ 18:00 | |
| G3 | 3 | 10 | 18:00 ~ 9:00 | |
| G4 | 2 | 10 | 9:00 ~ 18:00 | |
| G4 | 1 | 10 | 18:00 ~ 9:00 | |
| . | . | . | . | . |
| . | . | . | . | . |
| . | . | . | . | . |

DESTINATION REGISTRATION DATA TABLE

| NUMBER | DESTINATION TERMINAL NUMBER | COMMUNICATION MODE | RE-CALL INTERVAL(MIN.) | RE-CALL EFFECTIVE PERIOD (MIN.) | EFFECTIVE TIME |
|---|---|---|---|---|---|
| 001 | 03-3111-1111 | G3 | 5 | 15 | 9:00 ~ 18:00 |
| 001 | 03-3111-1111 | G3 | 3 | 10 | 18:00 ~ 9:00 |
| 010 | 03-3211-2221 | G4 | 2 | 10 | 9:00 ~ 17:00 |
| 010 | 03-3211-2221 | G4 | 1 | 10 | 17:00 ~ 9:00 |
| 011 | 03-3331-3111 | G4 | 1 | 10 | |

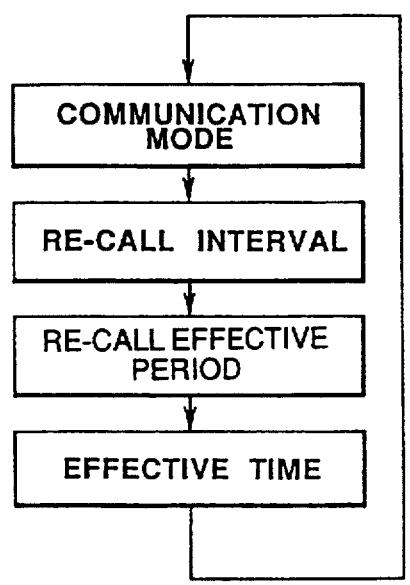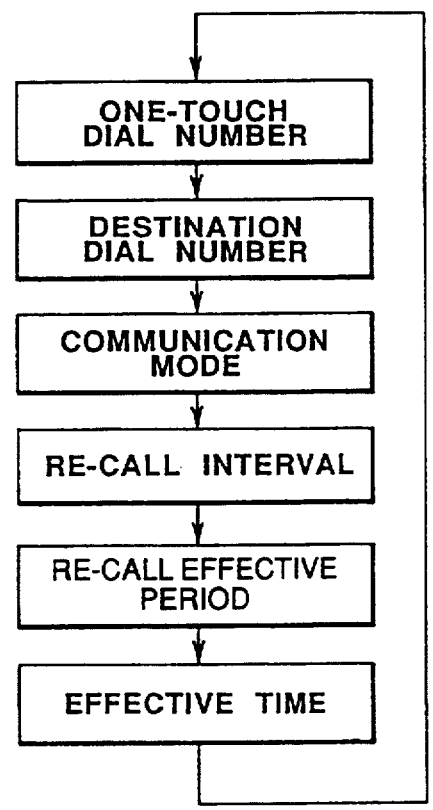
FIG. 4a
FIG. 4b

SYSTEM SETTING DATA TABLE

| COMMUNICATION MODE | RE-CALL INTERVAL (MIN.) | RE-CALL EFFECTIVE PERIOD (MIN.) | EFFECTIVE TIME | |
|---|---|---|---|---|
| G3 | 10 | 30 | 9:00 ~ 11:00 | |
| G3 | 5 | 15 | 11:00 ~ 18:00 | |
| G3 | 3 | 10 | 18:00 ~ 9:00 | |
| G4 | 2 | 10 | 9:00 ~ 18:00 | |
| G4 | 1 | 10 | 18:00 ~ 9:00 | |
| ... | ... | ... | ... | |

FIG. 5

DESTINATION REGISTRATION DATA TABLE

| NUMBER | DESTINATION TERMINAL NUMBER | COMMUNICATION MODE | RE-CALL INTERVAL (MIN.) | RE-CALL EFFECTIVE PERIOD (MIN.) | EFFECTIVE TIME |
|---|---|---|---|---|---|
| 001 | 03-3111-1111 | G3 | 5 | 15 | 9:00 ~ 18:00 |
| 001 | 03-3111-1111 | G3 | 3 | 10 | 18:00 ~ 9:00 |
| 010 | 03-3211-2221 | G4 | 2 | 10 | 9:00 ~ 17:00 |
| 010 | 03-3211-2221 | G4 | 1 | 10 | 17:00 ~ 9:00 |
| 011 | 03-3331-3111 | G4 | 1 | 10 | |

FIG. 6

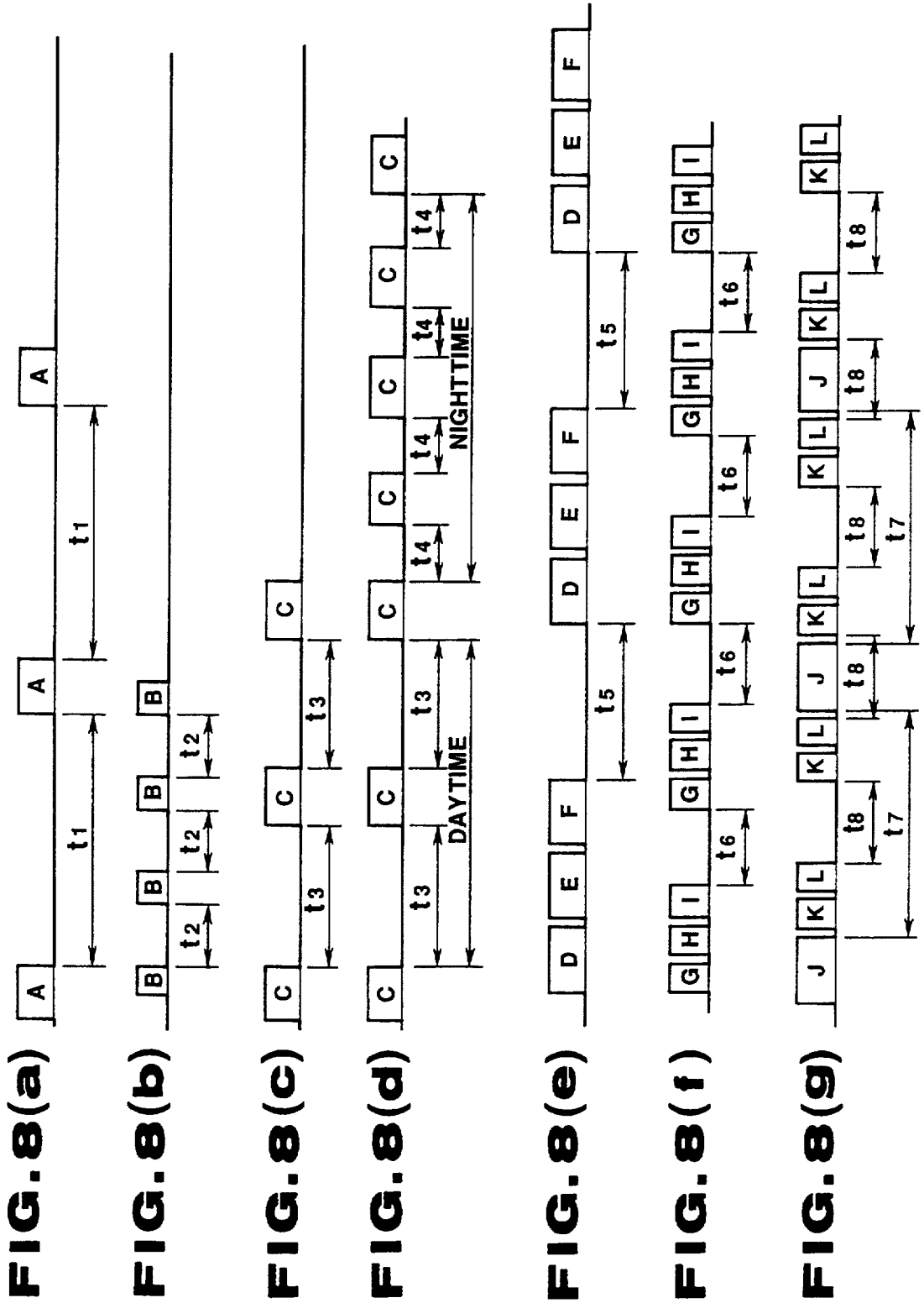

FACSIMILE MACHINE AND RE-CALL CONTROL METHOD THEREOF

This application is a continuation of application Ser. No. 07/661,014, filed Feb. 26, 1991, now abandoned.

BACKGROUND OF THE INVENTION

1. Field of the Invention

The present invention relates to a facsimile machine which has a function of storing image data and is adapted for communications based on a plurality of communication modes and, more particularly, to an improvement in a method for controlling an interval and frequency of a re-call necessary due to the busy state of a party according to the communication modes and communication quantities.

2. Description of the Related Art

For example, when a facsimile machine is connected only to a telephone line or a DDX line, the re-call frequency and interval of the facsimile machine are set at desired preset values so that, when a called party is busy, re-call is tried by the preset number of times within the preset interval.

In this case, since a plurality of terminals connected to the above line have similar operating characteristics (for example, communication rate), effective re-call control can be achieved, from the viewpoint of a line operating efficiency, by setting the re-call interval and re-call frequency at the preset fixed values as mentioned above.

Recently, a new integrated services digital network (which will be referred to as the ISDN, hereinafter) has been created. ISDN is heterogeneous to the aforementioned existing line network and synthetically handles different communication services.

A facsimile machine adapted for the ISDN not only can perform G4 communication on the ISDN line but also can form a single communication network, for example, by interworking with the existing telephone line network to also realize G3 communication with a facsimile machine of a G3 communication type in the existing telephone line network.

In other words, the ISDN facsimile machine has a function of handling a plurality of different communication modes including G3 and G4 communication through the ISDN.

Accordingly, with the facsimile machine having a function of handling a plurality of different communication modes, when the re-call frequency and re-call interval are set to a fixed value as mentioned above, the facsimile machine's line operating efficiency is reduced due to a difference in communication rate between the G4 and G3 communication (usually, 64 Kbps for the G4 communication and 9.6 Kbps for the G3 communication).

For example, when the re-call interval for the busy party is set based on the G4 communication, the re-call interval becomes so short in the G3 communication that the re-call often results again in the busy party. However, when the re-call interval for the busy party is set based on the G3 communication, the re-call interval becomes too long in the G4 communication and requires a long time to terminate the transmission.

Generally speaking, a communication quantity (a communication frequency and a traffic quantity) tends to vary greatly from day-to-day or time-to-time. For example, when the re-call interval is set based on less traffic quantity, such a situation that the party is busy often occurs at the time when traffic quantity is great. However, when the re-call interval is set based on more traffic, a time necessary for transmission completion becomes remarkably long.

In this way, the prior art facsimile machine adapted for a plurality of different communication modes has had the problem that, with regard to re-call control required due to a busy party, since the re-call frequency and re-call interval are set to have a fixed value, the re-call interval becomes so short in certain communication modes, and communication quantity results again in encountering the busy state. Alternatively, the re-call interval becomes too long in certain communication modes, and communication quantity results in requiring a long time to access the party, whereby its line operating efficiency is eventually reduced to a large extent.

SUMMARY OF THE INVENTION

It is, therefore, an object of the present invention to provide a facsimile machine which can perform re-call operation always at a suitable re-call frequency (repeated number of re-calls) and re-call interval (a time period between one re-call and the next re-call) even in different communication modes and even when a communication quantity varies with date and time.

It is also an object of the present invention to provide a facsimile machine which can prompt rapid connection with a party after a call is rejected, thus contributing to an improvement in the line operating efficiency of a line having the mixed communication modes.

It is another object of the present invention to provide an improved re-call control method for a facsimile machine.

Another object of the present invention is to provide a facsimile machine capable of realizing more efficient operations as an entire system, which, when re-calling a specific terminal, carries out the control of the re-call by using a re-call control condition set for the specific terminal to improve a probability of accessing the specific terminal and to, thereby, realize more efficient operations as the entire system, and a re-call control method.

A further object of the present invention is to provide a facsimile machine which, even after communication is interrupted, can promote re-call at suitable timing for the communication mode and communication quantity of the interrupted communication, whereby, even in the re-calling operation after the communication error, a line operating efficiency can be maintained at a level equivalent to the usual re-call.

In order to attain the above objects, there is provided a facsimile machine which comprises transmission control means for performing transmission control over communication based on a plurality of communication modes; memory means for storing image data therein; input operating means having a group of keys for input of various operating commands; system setting means for setting, on a system basis, re-call control conditions in which a re-call frequency and re-call interval are specified in accordance with said plurality of communication modes and assumed traffic quantity; destination registration setting means for setting the re-call control conditions in association with telephone numbers of destination terminals with respect to each of the destination terminals; time management means for managing various operation times including at least the re-call interval; and main control means including selection means for selecting, when issuing a call, one of the re-call control conditions associated with a destination terminal to be called from the re-call control conditions set in the system setting means or from the re-call control conditions set in the destination registration setting means, and re-call control means for controlling, when re-calling the destination terminal to be called, the re-call interval and frequency in accordance with the selected re-call control conditions.

In accordance with another aspect of the present invention, there is provided a re-call control method for a facsimile machine having image data storage means and input operating means for input of various operation commands and adapted for communication based on a plurality of communication modes, the method comprising a first setting step of setting, on a system basis, re-call control conditions in which a re-call frequency and re-call interval are specified in association with the plurality of communication modes and assumed traffic quantity; a second setting step of setting the re-call control conditions in association with telephone numbers of destination terminals with respect to each of the destination terminals; managing various operation times including at least the re-call interval; selecting when issuing a call, one of the re-call control conditions associated with a destination terminal to be called from among the re-call control conditions set by the first and second setting steps; and controlling, when re-calling the destination terminal to be called, the interval and frequency of a re-call in accordance with the selected one of the re-call control conditions.

In another aspect of the present invention, when the re-call control conditions for the destination terminal to be called are already set in the destination registration setting means, the selection means preferentially selects the re-call control conditions set in the destination registration setting means over the re-call control conditions set in system setting means.

In a further aspect of the present invention, the re-call control means holds the re-call control conditions selected by the selection means until communication ends and controls the re-call interval and re-call frequency for the same communication terminal after an interruption of the communication on the basis of the held re-call control conditions.

In the present invention, the re-call frequency and re-call interval are set according to the communication mode and communication quantity as mentioned above. There are two methods of setting these re-call control conditions, that is, system setting and destination registration setting.

In the system setting method, a plurality of re-call intervals and frequencies are set merely according to the communication mode and communication quantity.

In the destination registration setting method, on the other hand, a plurality of the aforementioned re-call intervals and frequencies according to the communication modes and communication quantities are set in association with destination terminals and their destination terminal numbers.

After the above setting is completed, when it is desired to provide re-call due to the busy party, it is first determined whether the destination registration setting is already done for the re-call.

When the destination registration setting is already done, the re-call is carried out according to the set conditions.

When the destination registration setting is not done the re-call is carried out according to the re-call control conditions based on the system setting different from the destination registration setting.

Even if both re-calls are based on the respective set conditions, the re-call is tried with the re-call interval and re-call frequency suitably set based on the communication mode and communication quantity. Accordingly, when the connection with the party is tried at suitable timing with respect to the different communication modes and communication quantities varying with date and time, its line operating efficiency can be improved.

For example, the re-call is carried out in the G3 communication mode with the not-too-short interval to reduce a possibility of falling again into the busy state. However, the re-call is carried out in the G4 communication mode with the not-too-long interval to avoid such a long-time wait situation despite the possibility of access to the party.

Since the re-call control conditions of the present invention include not only the communication modes but also such parameters as the communication quantities, the following re-call control may be realized depending on the setting of the re-call control conditions.

For example, in the case of high traffic quantity, the re-call response possibility can be increased by performing the re-call with intervals somewhat longer than in the usual case with respect to the respective communication modes.

Conversely, in the case of less traffic quantity, the party-connection wait time can be decreased to a large extent by performing the re-call with intervals shorter than in the usual case with respect to the respective communication modes.

Meanwhile, even though the communication mode is the same, when operating conditions of the respective terminals are different from each other (e.g., in a case where a terminal whose operating frequency is extremely high exists), there may be a deterioration in a probability of accessing to a desired terminal if control of the re-call interval is carried out based only on the communication mode.

To cope with this, in accordance with the present invention, the re-call control condition of each terminal, which is given a priority to the communication modes, is set in the destination registration section for each specific terminal, taking its operating frequency into account, and when re-call is to be made to that specific terminal, the re-call interval and re-call frequency are controlled in accordance with the re-call control condition set in the destination registration section.

As mentioned above, the re-call control conditions set for the respective terminals are used together with the re-call control conditions set for the system modes and, when a re-call is to be made to a specific terminal, the control of the re-call is carried out by using the re-call control condition set for the specific terminal so that an improvement in the probability of accessing to the specific terminal can be expected. Compared with a case where the re-call interval is simply controlled based only on the communication modes, useless accessing operations can be eliminated as the probability of accessing to the specific terminal is improved whereby the system can be more efficiently operated.

Further, in accordance with the present invention, even after the initial call is accepted at the party and the facsimile machine is shifted immediately to its communication state, the re-call control conditions based on the system setting or the destination registration setting selected at the time of the calling are held until the communication ends. Additionally, when the communication is interrupted due to the generation of a communication error, the re-call is carried out according to the re-call conditions so long as the re-call frequency of the re-call control conditions is valid.

In this way, since the re-call control conditions based on the system setting or the destination registration setting are applied even for the re-call to the same terminal with which the communication has been performed, after the communication error has occurred, the communication is rapidly restored after the communication interruption through the same control for a case of re-calling when the terminal is in the busy state.

BRIEF DESCRIPTION OF THE DRAWINGS

FIG. 4a shows an example of an input mode transition flow when the re-call control conditions are set on a system basis according to the setting procedure of the FIG. 3;

FIG. 4b shows an example of an input mode transition flow when the re-call control conditions are set on a destination terminal basis according to the setting procedure of the FIG. 3;

FIG. 5 shows an exemplary structure of a system setting data table in which the re-call control conditions are stored according to the input mode transition flow of FIG. 4a;

FIG. 6 shows an exemplary structure of a destination registration data data table in which the re-call control conditions are stored according to the input mode transition flow of FIG. 4b;

FIG. 8 shows diagrams for explaining a plurality of examples of re-call timing based on the re-call control method of the present invention.

DESCRIPTION OF THE PREFERRED EMBODIMENTS

The present invention will be detailed with reference to the accompanying drawings showing embodiments.

Figure 1:
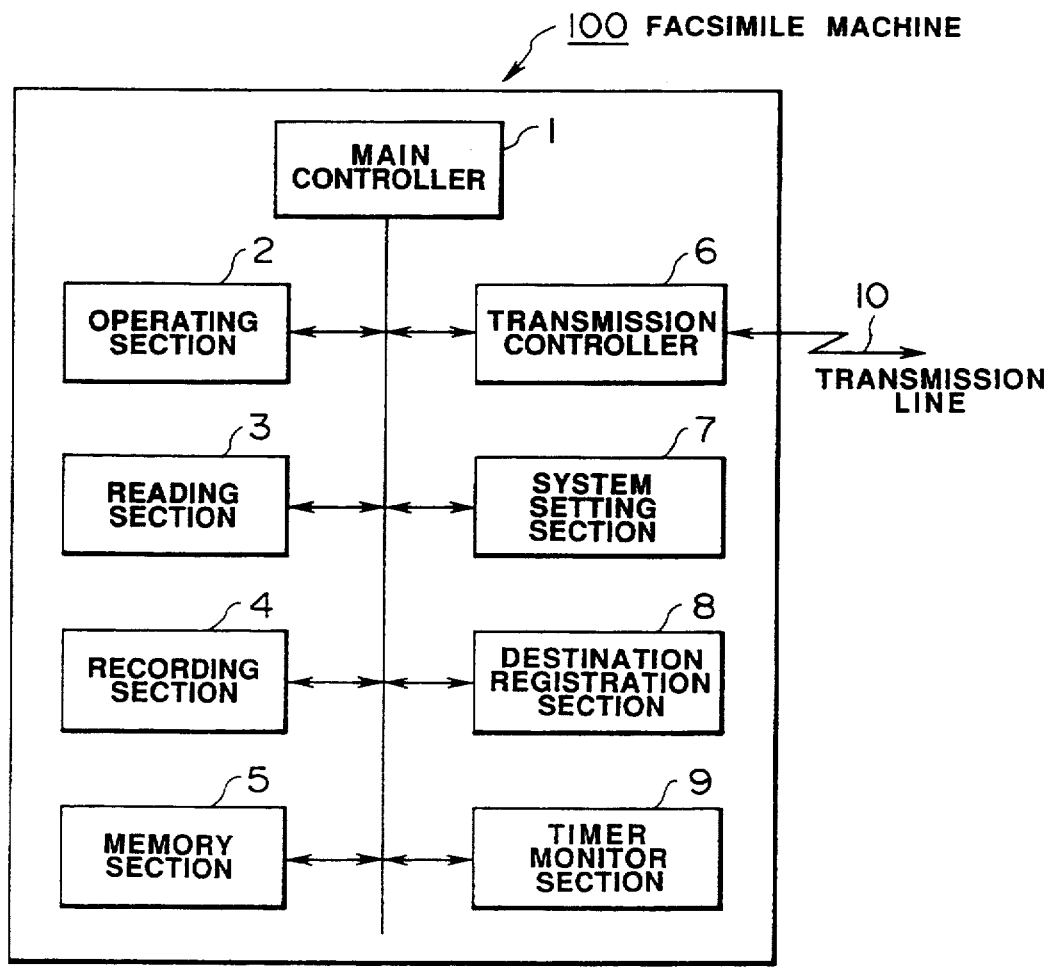
FIG. 1 is a block diagram of a facsimile machine in accordance with an embodiment of the present invention.

Referring first to FIG. 1, there is shown a block diagram of a facsimile machine 100 in accordance with an embodiment of the present invention. The facsimile machine 100 comprises a main controller 1 for performing general control over the present facsimile machine, an operating section 2 for various input operations through ten keys or the like and for input display, a reading section 3 for reading data from an original document, a recording section 4 for recording a read or received picture image, a memory section 5 for storing therein data corresponding to the read or received picture image, a transmission controller 6 for performing transmission control of facsimile communication, a system setting section 7 for setting a plurality of re-call frequencies and intervals thereof as control conditions of unit system according to a communication mode and a quantity of communication, a destination registration section 8 for arbitrarily registering the re-call frequencies and intervals together with a call destination receiver and a telephone number thereof associated therewith, and a timer monitoring section 9 for performing time management of various control operations including re-calling intervals based on a timer function.

The facsimile machine 100 is connected at its transmission controller 6 with transmission line 10 as an ISDN line or a telephone line.

Figure 2:
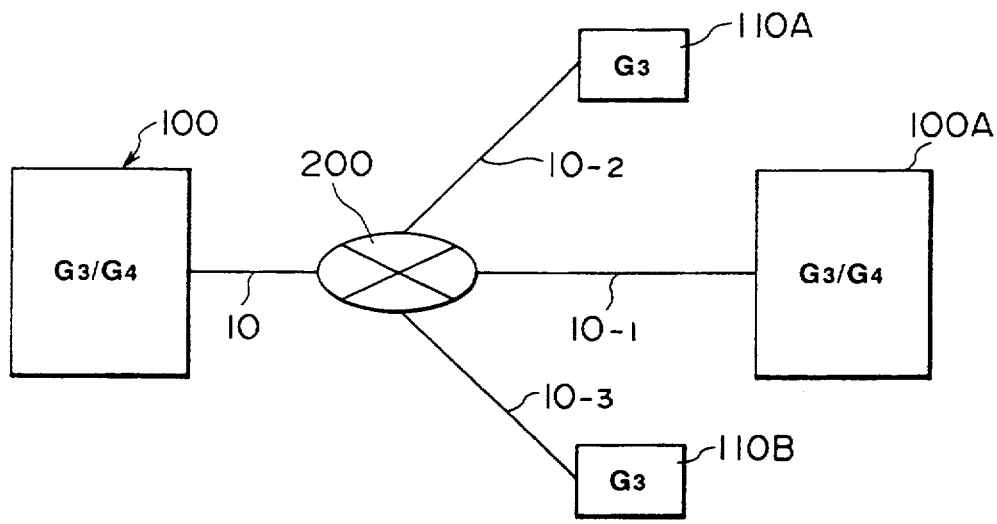
FIG. 2 is a system configuration showing an example of a communication network using the facsimile machine of the present invention.

It is assumed that the facsimile machine 100 is a terminal adapted for the ISDN line, realizing a communication network configuration of the type illustrated in FIG. 2.

In FIG. 2, the facsimile machine 100 as an ISDN terminal is connected to a communication network 200 through the ISDN transmission line 10.

The communication network 200 is further connected through a transmission line 10-1 to an ISDN terminal 100A, and also through existing telephone network lines 10-2 and 10-3 to G3 facsimile terminals 110A and 110B.

With the communication network 200 connected as mentioned above, the facsimile machine 100 can freely communication (G4 communication mode) via the ISDN Line with the terminal 100A because the terminal 100A is of the same ISDN type as the facsimile machine.

Further, the facsimile machine 100 can also communicate (G3 communication mode) with the G3 facsimile terminals 110A or 110B in the existing telephone line network through the telephone lines 10-2 and 10-3, respectively, under the control of interworking with the communication network 200.

With the communication network configuration of FIG. 2, having facsimile machines adapted for a plurality of communication modes (such as G3 and G4) when re-call is desired because a call destination is busy, and fixed values for both of the communication modes are set for its re-calling interval and frequency, there is a reduction of operating efficiency, because the set values become too short or long for one of the communication modes when one communication mode is employed.

For eliminating the above disadvantage, the facsimile machine 100 of the preferred embodiment of the present invention is arranged so that the re-calling interval and frequency can be set to be different in the respective communication modes.

In addition, in accordance with the present invention, in setting the re-calling interval and frequency to be different in the respective communication modes of the facsimile machine 100, either one of methods for setting these re-calling control conditions on a system basis and on a destination-terminal basis can be selected.

In both methods for setting the re-calling control conditions, keys on the operating section 2 of the facsimile machine 100 are commonly used.

For example, when the method for setting the re-calling control conditions on a system basis is selected, ten keys of the keys on the operating section 2 may be used. In other words, the caller enters, through the ten keys, a plurality of desired re-call frequencies and their intervals as system-basis re-call control elements in association with the G4 and G3 communication modes adapted for the facsimile machine 100 and with communication quantities varying with date and time to store the input data in a table (which will be detailed later) in the system setting section 7.

When the method for setting the re-calling control conditions on the destination-terminal basis is selected, on the other hand, an abbreviation dial or a one-touch dial key on the operating section 2 can be used.

In other words, as the re-call control elements for each terminal, the caller individually enters, through the one-touch or abbreviation dial key, the telephone number of a party to communicate with and, thereafter, successively entering the telephone number, the specific input key for a desired re-call frequency and a re-call interval associated with the communication mode and the communication quantity of the party to thereby store the input data into a table (which will be detailed later) in the destination registration section 8.

First, when setting the re-call control conditions, the operator depresses a specific key on the operating section 2 of the facsimile machine 10) to set an input mode for input of initial control elements among the plurality of re-call control elements (S301).

The operator then determines whether there are control elements to be entered in the input mode (S302).

When determining that the input of the control elements is unnecessary, the operator determines whether the input mode reaches a final mode (S303). When the input mode reaches the final mode, the control element setting processing is ended.

If the operator determines in the step S303 that another control element input mode remains, then the operator advances the current input mode to the next one (S304).

This advancing operation causes the input mode for the next control element to be set (S301) so that another control element different from that of the previous input mode can be entered.

The repetitive execution of the above processings from the step S301 to step S304 causes the sequential updating of the input mode, whereby the necessary control element can be entered in the desired input mode (S305).

During the above operation, it is monitored whether or not there is remaining input data (S306) to enter the necessary data always completely while sequentially updating the input mode and to realize the accurate setting of all the necessary re-call control elements.

With respect to the above control-element setting processing, the transition of the input mode in the S301 processing, in particular, for setting of the system-basis re-call control conditions is as shown in FIG. 4a.

As shown in FIG. 4a, in the transition of the input mode for setting of the system-basis re-call control conditions, at least a communication mode, a re-call interval, a re-call effective period during which the re-call is repeated at the re-call interval (as a result, the re-call frequency is determined), and a control effective time during which the re-call control conditions are effective are entered as control elements.

In the S301 processing for setting of the destination-terminal-basis re-call control conditions, on the other hand, its input mode is transited according to such a flow as shown in FIG. 4b.

In the transition flow of FIG. 4b for setting of the destination-terminal-basis re-call control conditions, a number associated with an abbreviated or one-touch dial function and the actual dial number of the destination terminal are additionally entered as control elements, together with the same communication mode, re-call interval, re-call effective period, and control effective time as those in the input mode for setting of the system-basis re-call control conditions.

Of the input data (re-call control elements) set based on such system-basis and terminal-basis re-call control conditions as mentioned above, the input data set on system basis are set, in particular, in a system set data table prepared within the system setting section 7.

An example of the system set data table within the system setting section 7 is shown in FIG. 5, in which, in the present invention, such control element data as the communication mode, re-call interval, re-call effective period and control effective time are stored according to the input mode transition (FIG. 4a).

Meanwhile, the input data set on the destination terminal basis are set in a destination registration data table prepared within the destination registration section 8.

Shown in FIG. 6 is an example of the destination registration data table within the destination registration section 8, in which, in the present invention, such control element data as the communication mode, re-call interval, re-call effective period and control effective time are stored together with the number associated with the one-touch function and the actual dial number of the associated destination terminal, according to the input mode transition (FIG. 4b).

In the facsimile machine 100 having the re-call control element data set on system basis or on destination terminal basis in the aforementioned manner, when the party terminal or network is busy, the subsequent re-call control is carried out through cooperative processings of the system setting section 7, destination registration section 8 and time monitor section 9 under the general control of the main controller 1.

Figure 7:
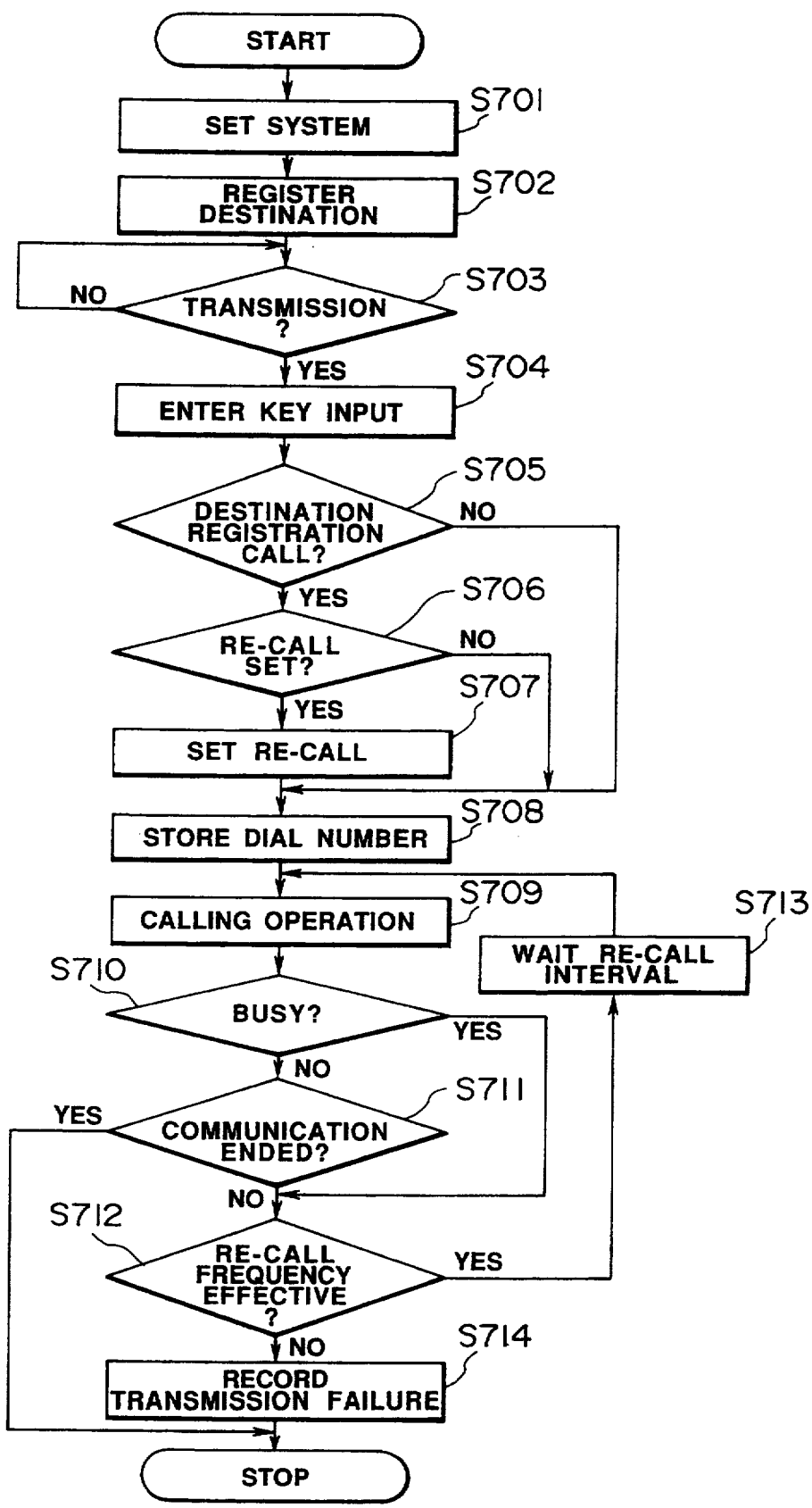
FIG. 7 is a flowchart showing an example of the calling operation based on the re-call control method of the facsimile machine of the present invention.

The re-call control operation of the facsimile machine 100 in accordance with the present invention will be detailed by referring to a flowchart of FIG. 7 showing its specific example.

First, prior to the start of the re-call control operation, the operator previously sets the system setting function or the destination registration setting function through the operating section 2 (steps 701 and 702).

Figure 3:
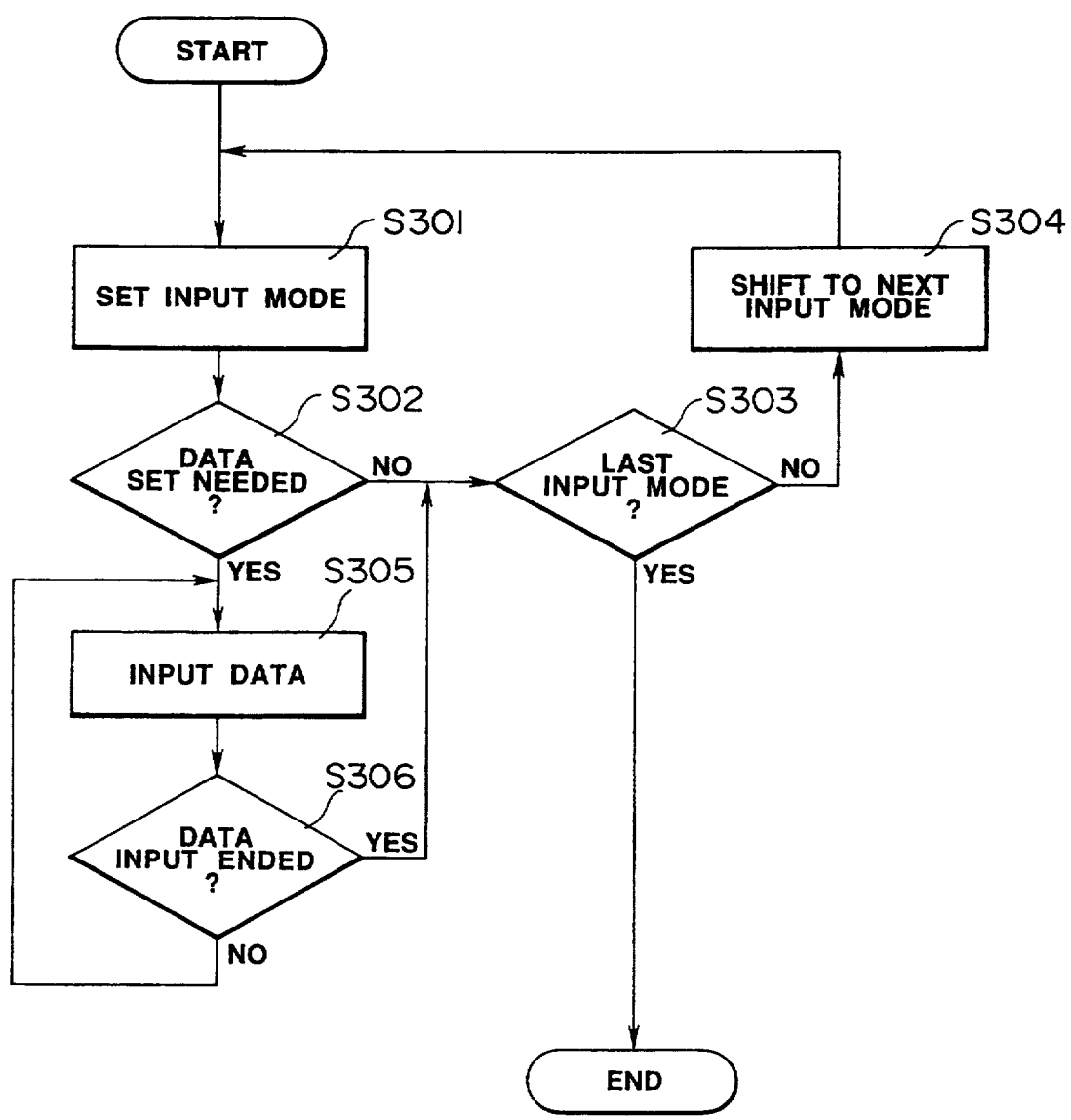
FIG. 3 is a flowchart showing a procedure of setting re-call control conditions in accordance with a re-call control method of the present invention.

The processings of the steps 701 and 702 can be realized through a series of processings of S301 to S306 in FIG. 3.

As a result, with respect to the system setting function, a plurality of desired re-call effective periods (or frequencies) and intervals are set in the system setting section 7 in association with the G4 and G3 communication modes for which the facsimile machine 100 can be operated as well as communication quantities varying with date and hour.

With respect to the destination registration setting function, the desired re-call frequency and interval are set through the one-touch or abbreviation dial key in the destination registration section 8, in association with the party number, the party communication mode and communication quantity, for each of the call destination receivers.

Thereafter, the main controller 1 monitors the operated state of the operating section 2 and judges whether or not a send (call) request was generated (step 703).

When determining the presence of the send request, the main controller 1 receives a key input from the operating section 2 (step 704) and determines whether the key input is from the ten keys or from such a destination registration key as the one-touch or abbreviation dial key (step 705).

When the main controller 1 determines that the key input is a call not based on the destination registration, i.e., it is an ordinary dial call input from the ten keys, the main controller immediately stores the dial number in the destination registration section 8 (step 708).

On the other hand, when the main controller 1 determines that the key input is a destination registration call, i.e., a call based on the one-touch key, the main controller 1 first reads out the number of the party corresponding to the input key from the destination registration section 8 and then determines whether or not the read party number is already set based on the re-call setting function (step 706).

In the determination in the step 706, the main controller 1 makes reference to the registration state of the re-call control element data associated with the party number of the current call already stored in the destination registration data table (refer to FIG. 6) of the destination registration section 8.

At this stage, if the main controller 1 determines that the re-call setting function is not set, then the controller stores the party number entered in the step 704 in the destination registration section 8 and immediately shifts to a step 708 for preparation of the calling operation.

Meanwhile, when determining that the re-call frequency and interval associated with the party number entered in the step 704 are already set, the main controller 1 sets the re-call to the party in the system setting section 7 according to the set conditions (step 707).

In the re-call setting operation, the main controller 1 reads out such control element data as the re-call interval corresponding to the number of the party for the re-call from the aforementioned destination registration table of the destination registration section 8 and newly stores it in a control execution data region of the system setting section 7.

Thereafter, the main controller 1 controls the transmission controller 6 to provide the calling operation.

In the calling operation, more in detail, the main controller 1 reads out the party number already stored in the step 708 from the destination registration section 8 and controls the transmission controller 6 to cause the calling operation of the transmission controller 6 to the transmission line 10 on the basis of the read-out party number (step 709).

At this time, the main controller 1 monitors whether or not the party or the network is busy for the above calling operation (step 710).

When the main controller 1 determines that the party or the network is not busy, the main controller 1 starts its communication in response to a party's answer.

After starting the communication, the main controller 1 monitors whether or not the communication was completed (step 711). The completion of the communication causes the main controller 1 to terminate the communication operation.

Meanwhile, the main controller 1 determines in the step 710 that the party or the network is busy, the main controller 1 once disconnects the line.

At the same time, the main controller 1 retrieves the re-call control data stored in the system setting section 7 to determine whether or not the re-call setting is made for the party number of the current call.

When determining that the re-call setting is made, the main controller 1 determines whether the re-call frequency is valid (step 712). If so, the main controller 1 waits only for the valid duration, i.e., the specified re-call interval monitored by the timer monitor section 9 (step 713) and then preforms the re-calling operation (step 709).

In this way, when the party or the network is busy, the re-calling operation (Steps 709 to 703) is repeatedly performed so that, when the party is released from its busy state and answers to the call, a communication between the party and the caller facsimile machine can be started.

In this connection, although it is out of consideration when the above communication is normally ended, if a communication error is generated during the communication, it requires the re-transmission of the original document from the beginning or from the middle thereof and, thus, the additional re-calling operation.

In the facsimile machine of the present invention, even when this sort of communication error causes the interruption of the communication, the machine can be shifted to the re-calling operation in such a manner as to be described below.

In other words, in accordance with the present invention, not only when the party is busy at the time of a call but also after the caller starts the communication with the party, it always monitors through the step 712 whether or no the re-call frequency is valid.

When re-calling operation is repetitively done due to the busy state of the called party, the re-calling operation is immediately ended in the step 712 as soon as the re-call frequency exceeds its specified value.

Meanwhile, when the communication is interrupted due to a communication error, it is determined in step 712 at that moment whether or not the re-call frequency is valid.

At this time, when it is determined that the re-call frequency is valid, the re-calling operation is repeated by the remaining re-call frequency until the last.

During the re-calling operation described above, if the party responds to the re-call, then a communication can be started as in the case of the re-call response of the busy party.

When the facsimile machine is restored from the interrupted state of the communication caused by a communication error again to the in-communication state in this way, the system suitably sets whether the transmission of image data is carried out from the beginning page of the original document or from that page of the document in which the communication error took place.

In the case where, for the re-calling operation based on the communication interruption due to such a communication error, the party does not respond to the re-call until the re-call effective period has expired, the facsimile machine terminates its re-call control operation immediately after determining this in the step 712.

At this time, the facsimile machine records and discharges the transmission failure in the form of message indicative of the transmission abnormally ended to present the message to the operator, at which stage a series of calling operations are terminated.

This sort of transmission failure message may be presented to the operator by displaying sentences telling the contents of the message on a display of the operating section 2.

In accordance with an embodiment of the present invention, when the re-call control conditions are set on a system basis or on a destination-terminal basis to actually provide the re-calling operation, it is determined by the types of call command keys whether the control conditions based on the system setting function are selected or the control conditions based on the destination registration setting function are selected (steps 705 and 706).

If a call is issued through the ten keys and its re-calling operation for the call becomes necessary, then the system performs the re-calling operation by referring only to the system-basis control conditions set in the system setting section 7 (steps 708 and 709).

Meanwhile, when a call is issued through the abbreviation or one-touch dial key and its re-calling operation is required, the system usually follows the destination-terminal-basis control conditions set in the destination registration section 8.

With such a facsimile machine which realizes the setting of the re-call control conditions on the destination-terminal basis through the additional function of the one-touch or abbreviation dial registration function as the present invention, in the case where only the usual destination registration is required, the re-call control conditions may not have been set for its destination terminals.

For this reason, in case of such re-calling operation, it is first judged whether or not the re-call conditions have already been set for the party (step 706). When it is determined that the re-call conditions have already been set, the control conditions adapted for the individual party are newly shifted into the system setting section 7 (step 707) to perform the re-call control on the basis of the shifted control conditions.

In this case, the re-call for the call of the abbreviation or one-touch dial key is also carried out on the basis of the conditions set in the system setting section 7. However, since the set conditions of the system setting section 7 correspond to the destination-terminal-basis control conditions shifted from the destination registration section 8, the re-call control results in that a clear distinction can be made between the re-call based on the system setting function and the re-call based on the destination terminal setting function.

Explanation will next be made by referring to FIG. 8 as to the actual re-calling timing of the calling operation of the facsimile machine 100 of the present invention based on the foregoing re-call control method.

First, FIG. 8(a) shows an example of the re-call timing with respect to a destination (G3 facsimile terminal) A adapted for the G3 communication mode.

In this example, after it is confirmed that the destination A is busy, the re-calling operation is effected after passage of a re-call interval t1 preset for the G3 communication mode.

FIG. 8(b) shows an example of the re-call timing with respect to a destination (G4 facsimile terminal) B adapted for the G4 communication mode.

In this example after it is confirmed that the destination B is busy, the re-calling operation is effected after passage of a re-call interval t2 preset for the G4 communication mode.

The re-call interval t2 for the G4 communication mode is set to be shorter than the re-call interval t1 for the G3 communication mode so that a line operating efficiency can be improved by shortening the time necessary for the re-call according to its transmission characteristic.

FIG. 8(c) is a modification example of FIG. 8(a), in which the re-call is effected with a re-call interval t3 set to be individually adapted to a destination C having the same G3 communication mode as the destination A through the destination registration setting function.

In this re-calling operation, the re-call interval t3 for the destination C is set to be shorter than the re-call interval t1 for the destination A so that the line operating efficiency of the destination C can be further improved.

FIG. 8(d) shows an example of a re-calling pattern in which communication quantities varying with time reflect on the re-call pattern of FIG. 8(c).

In this example, with respect to the destination C adapted for the G3 communication mode, the relatively long re-call interval t3 is set in such a time zone having much communication quantity as a daytime period while a relatively short re-call interval t4 is set in such a time zone having less communication quantity as nighttime, for instance.

In this way, the control method for setting the re-call interval to one destination according to its communication quantity may be similarly applied not only to the communication of the G3 communication mode of FIG. 8(d) but also to the communication of the G4 communication mode.

FIG. 8(e) shows an example of the re-call timing when multi-address calling is carried out for three destinations D, E and F in the G3 communication mode.

In this example, when it is confirmed that the destinations D, E and F are all busy, the re-call is carried out after passage of a long re-call interval t5 following the calling of the last destination F corresponding to the G3 communication mode.

FIG. 8(f) shows an example of the re-call timing when multi-address calling is carried out for three destinations G, H and I in the G4 communication mode.

In this example, when the destinations to be called are all busy, the re-call is carried out after passage of a re-call interval t6 shorter than the re-call interval t5 of the G3 communication mode communication following the calling of the last destination I.

FIG. 8(g) shows an example of the re-call timing when multi-address calling is carried out for three destinations J, K and L mixed with the G3 and G4 communication modes.

In this example, two re-call intervals t7 and t8 are set for the three destinations J, K and L and for the respective communication modes, so that, when the destinations J, K and L are all busy, the re-call is carried out for the destination J of the G3 communication mode for passage of the re-call interval t7 while the re-call is carried out for the destinations K and L of the G4 communication mode after passage of the re-call interval t8 shorter than the interval t7.

The foregoing is merely an embodiment of the present invention and, thus, it goes without saying that the present invention may be modified and applied in various ways as long as the modifications are included in the scope of the subject matter of the invention.

For example, in the examples of FIG. 8(e), (f) and (g), although explanation has been made in the case where multi-address calling is carried out for the three destinations and the three destinations are all busy, there may be considered such an example that, when two or one of the three destinations becomes busy, re-call is set to be carried out only for these busy terminals.

Further, the present invention can cope with the re-call control for the re-transmission of all the pages or a specific page when a communication error took place.

In this case, for example, when a communication error occurred in the effective period of the re-call frequency in the processings of the steps 711 and 712 of FIG. 7, the re-call is carried out after recognition of the communication error and after passage of a preset re-call interval.

When the re-call after the communication interruption is carried out within the remaining effective re-call frequency, the connection with the same destination can be again realized, its operability can be improved over that when the re-calling procedure is effected after the communication interruption, which can somewhat contribute to an improvement in the line operating efficiency.

In addition, although explanation has been made in connection with the case where a plurality of re-call intervals are set according to the communication modes and communication quantities in the foregoing embodiments, it goes without saying that a plurality of the re-call frequencies may be similarly set.

What is claimed is:

1. A facsimile machine comprising:
   transmission control means for performing transmission control over communication based on a plurality of facsimile communication modes;
   memory means for storing image data therein;
   input operating means having a group of keys for input of various operating commands;
   re-call control condition setting means for setting at least one of a first re-call control condition in which a re-call frequency and a re-call interval are specified for each terminal in accordance with one of the facsimile communication modes and traffic quantity of each terminal, and a second re-call control condition in which the re-call frequency and the re-call interval are specified in association with a terminal number of each terminal;
   time management means for managing various operating time including at least the re-call interval; and
   main control means including
      selection means for selecting one of the re-call control conditions associated with a destination terminal to be called from the first and second re-call control conditions set by said re-call control condition setting means, and
      re-call control means for controlling the re-call interval and re-call frequency of the destination terminal in accordance with said one of the re-call control conditions selected by said selection means, wherein the re-call control conditions are selectively changed for the same destination terminal in correspondence with the one of the facsimile communication modes or a terminal number of the destination terminal so as to improve a success probability of access to the destination terminal.

2. A facsimile machine as set forth in claim 1, wherein time data indicative of a communication time zone is used as an index of said traffic quantity which is one of said re-call control conditions.

3. A facsimile machine as set forth in claim 1, wherein setting of said first re-call control condition is carried out through key input of said input operating means.

4. A facsimile machine as set forth in claim 1, wherein setting of said second re-call control condition is carried out through key input of said input operating means utilizing an abbreviation dial input mode or a one-touch dial input mode.

5. A facsimile machine as set forth in claim 1, wherein when issuing the call, if both said first and second re-call control conditions associated with the destination terminal to be called are already set, said selection means preferentially selects said second re-call control condition over the first re-call control condition.

6. A facsimile machine as set forth in claim 1, wherein, when a calling operation is carried out through key input of any keys other than an abbreviation dial key or a one-touch dial key, said selection means selects the first re-call control condition.

7. A facsimile machine as set forth in claim 1, wherein said re-call control means holds said re-call control condition selected by said selecting means until the communication ends and controls the re-call interval and re-call frequency for a first destination terminal after an interruption of the communication in accordance with the held re-call control condition.

8. A facsimile machine as set forth in claim 7, further comprising means, after said machine is restored to the communication state through the re-call, for determining whether the image data already stored in said memory means is again transmitted from its first page or from a page immediately before the communication interruption.

9. A re-call control method for a facsimile machine having image data storage means and input operating means for input of various operation commands and for communication based on a plurality of facsimile communication modes, said method comprising:
   a re-call control condition setting step of setting at least one of a first re-call control condition in which a re-call frequency and re-call interval are specified for each one of a plurality of terminals in accordance with one of the facsimile communication modes and traffic quantity of each terminal and a second re-call control condition in which the re-call frequency and re-call interval are specified in association with a terminal number of each terminal;
   a time managing step of managing various operation time including at least the re-call interval;
   a selecting step of selecting one of the re-call control conditions associated with a destination terminal to be called from among the first and second re-call control conditions set during said re-call control condition setting step; and
   a re-call controlling step of controlling the re-call interval and re-call frequency of the destination terminal in accordance with said selected one of the re-call control conditions, wherein the re-call control conditions are selectively changed for the same destination terminal in correspondence with the facsimile communication modes or a terminal number of the destination terminal so as to improve a success probability of access to the destination terminal.

10. A re-call control method for a facsimile machine as set forth in claim 9, wherein time data indicative of a communication time zone is used as an index of said traffic quantity which is a part of one of said re-call control conditions.

11. A re-call control method for a facsimile machine as set forth in claim 9, wherein setting of the first re-call control condition during said first setting step is carried out through key input of said input operating means.

12. A re-call control method for a facsimile machine as set forth in claim 9, wherein setting of said second re-call control condition during said second setting step is carried out through key input of said input operating means utilizing an abbreviation dial input mode or a one-touch dial input mode.

13. A re-call control method for a facsimile machine as set forth in claim 9, wherein when issuing the call, if both the first and second re-call control conditions, associated with the destination terminal to be called, are already set, said selecting step preferentially selects the second re-call control condition over the first re-call control condition.

14. A re-call control method for a facsimile machine as set forth in claim 9, wherein, when a calling operation is carried out through key input of any keys other than an abbreviation dial key or a one-touch dial key, said selecting step selects the first re-call control condition already set during said first setting step.

15. A re-call control method for a facsimile machine as set forth in claim 9, wherein said re-call controlling step holds said one of the re-call control conditions selected during said selecting step until communication ends and when re-calling the same terminal after an interruption of the communication, controls the re-call interval and re-call frequency in accordance with the held re-call control condition.

16. A re-call control method for a facsimile machine as set forth in claim 15, further including the step of setting, after said machine is restored to the communication state through the re-call, for determining whether the image data already stored in said storage means is again transmitted from its first page or from a page immediately before the communication interruption.

* * * * *